Patented June 1, 1954

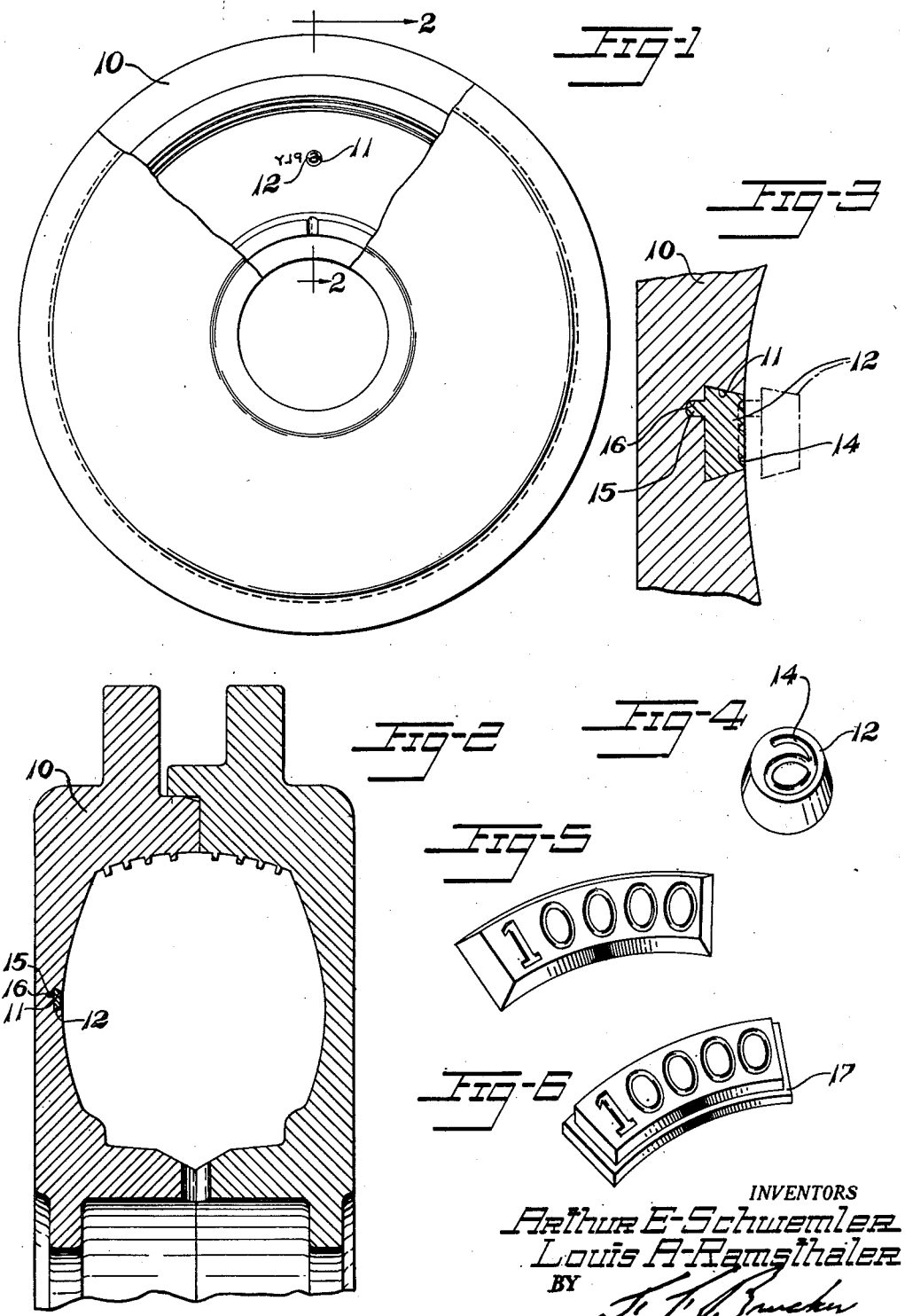

2,679,663

UNITED STATES PATENT OFFICE 2,679,663

MARKING OF MOLDED ARTICLES

Arthur E. Schwemler, Jacksonville, Fla., and Louis A. Ramsthaler, Akron, Ohio, assignors to The B. F. Goodrich Company, New York, N. Y., a corporation of New York Application February 1, 1950, Serial No. 141,794

4 Claims. (Cl. 18—38)

This invention relates to the marking of molded articles and is especially useful where similar articles bearing different indicia are to be produced in the same mold.

In the manufacture of molded rubber articles such for example as tires it has been proposed to provide molds with replaceable marking elements for molding selectively upon the face of the articles indicia differing from article to article and thereby producing a selection of articles from a single mold at a reduced cost. Such indicia applied to articles such as tire casings may indicate differences in construction or composition or may indicate the source or date of manufacture.

Heretofore such removable indicia have usually been formed of metal similar to that of the molds and have been expensive to produce. Also, difficulties have been encountered in that it has been difficult to fit the marking elements in the mold without leaving recesses thereabout or offsets which cause undesirable fins or protuberances on the articles and the threaded fastenings employed have been inconvenient and difficult to manipulate. Furthermore it has been difficult to change the marking elements without damage to the molds or to the marking elements.

The present invention aims to overcome the foregoing and other difficulties.

Objects of the invention are to provide for change of marking elements without damage to the mold, to provide for convenience of insertion and removal, to provide unbroken continuity of the surface of the mold and its marking element, to provide a superior marking element at lower cost, to provide a marking element of non-metallic and non-breakable material, and to provide for ready separation of the molded article from the marking element.

These and other objects will appear from the following description and the accompanying drawings.

Of the drawings,

Fig. 1 is a plan view of a mold showing a marking member corresponding to and embodying the invention in place in the mold.

Fig. 2 is a cross section of the mold taken on line 2—2 of Fig. 1,

Fig. 3 is an enlarged view of a portion of the mold of Fig. 2 showing the relative shape of the marking member or insert and the recess for receiving it, Fig. 4 is a perspective view of the insert, Fig. 5 is a perspective view of a marking member of different shape, and Fig. 6 is a similar view showing a modified form of marking member.

Referring to the drawings, these show a tire mold 10 of stiff material such as metal, it being understood that the invention may be employed with molds of other shapes and materials for forming other molded articles. At the position where it is desired to mark the article, a recess 11 is formed in the article-contacting face of the mold for receiving a removable marking member 12. In the example illustrated in Figs. 1 to 4, the recess 11 is round and has conical sides so as to be dove-tailed in cross-section and the marking member is also of conical shape to be received in the recess.

The marking member or insert is formed of deformable elastic material substantially non-compressible in volume capable of being molded and vulcanized and capable of completely filling the recess and of holding its shape when supported in the recess on all sides except its molding face. A composition of butyl rubber has been found to have desirable properties for the marking member as the vulcanized butyl rubber composition is incompatible with and will not adhere to the rubber material ordinarily used in tires even in the absence of a mold lubricant, and has sufficient firmness to produce a good sharp impression on the article, and will retain its properties after being used hundreds of times.

The following composition has been found suitable for the purpose:

| | |
|---|---|
| Butyl rubber | 100 |
| Carbon black | 70 |
| Zinc oxide | 15 |
| Benzothiazyl disulfide | 4 |
| Paraquinone dioxine | 2 |
| Sulfur | 2 |
| Petrolatum | 1.5 |
| Antioxidant | .5 |

The marking member is formed on its molding face with the desired marking such as a numeral desginated at 14. This indicia may be in relief or in a combination of intaglio and relief as desired.

Where the marking member is round, as shown in Figs. 1 to 4, it is desirable to provide means for locating it in the recess in the desired attitude or rotative position. For this purpose, a dowel 15 may be formed integral with the base of the member at a position eccentric thereto and a locating cavity 16 may be formed in the mold for receiving it.

The undercutting provided by the dovetailed recess together with the approximately conforming shape of the insert assist to retain the insert in place. For best results the insert is preformed as by molding to a volume corresponding closely to the volume of the recess, so that under the molding pressure in use when the insert has filled the recess completely and it is braced on all sides except the marking face no further distortion of it occurs and the desired marking face is maintained. The shape of the insert in its relaxed condition need not match exactly the shape of the recess owing to its resiliently flexible property. Advantageously the dimensions of the insert in the region of the marking face thereof may be in excess of the dimensions of the corresponding part of the recess, and the dimensions of the insert at the bottom thereof may be less than the dimensions of the corresponding part of the recess, so that as the insert is placed in the recess the lateral crowding of the face region of the insert will result in forces directed toward the bottom of the recess where the insert can spread rather than in the opposite direction. This action eliminates tendency for the resilient insert to pop out of the recess as the result of crowding and assists to retain the same in place without mechanical or other fastenings.

Referring to Fig. 5, this shows a marking member or insert of elongate form suitable for forming a name or other indicia on a tire or other article. As with the marking member 12 the sides of the insert are flared outwardly at its base so as to fit an undercut recess in the mold and the taper of the conical side walls of the marking member is less than that of the overhanging margins of the recess in the mold so that the marking member is deformed or compressed slightly at the molding face to provide the retaining action above discussed.

In the form of the invention illustrated in Fig. 6 the sidewalls of the marking member are not tapered but are provided with a projecting step or flange 17 thereabout which is adapted to be retained in a corresponding lateral groove or undercutting near the bottom of the recess in the mold. The stepped lower portion may be of somewhat lesser size than the undercut groove in the mold while that portion of the marking member above the step may be made somewhat larger in dimensions than the corresponding part of the recess in the mold to provide a retaining action such as that hereinabove described.

An alternate method of forming the marking elements is to provide the recess in the metal mold, to fill the recess with unvulcanized butyl rubber composition and then to mold the composition in place in the recess. The composition is then vulcanized in place in the mold. A previously molded article may be used as a mold member for impressing the indicia in the insert.

While it is desirable to use the ordinary mold lubricants such as soapstone powder or soap solution in the mold this is not necessary to prevent adhesion of the finished article to the marking element as due to the fact that the marking element is of butyl rubber composition adhesion will not occur.

Variations may be made without departing from the scope of the invention as it is defined by the following claims.

We claim:

1. A mold for forming a rubber article and providing a marking thereon comprising a body having a molding surface engageable with the material to be molded, the said body having an open top recess entirely contained within said body and extending inwardly from the said surface with the sidewalls of said recess being undercut so that a transverse dimension of the recess inwardly from said surface is greater than the corresponding transverse dimension of said recess at the said surface, and a removable insert of resilient distortable substantially non-compressible composition disposed in said recess and having its outer surface provided with a configuration complementary to the marking to be formed on the molded article, the shape of said insert being substantially complementary to the shape of said recess and the dimensions of said insert being such that it is resiliently retained therein with the base of said insert engaging the base of said recess and the sidewalls of said insert resiliently engaged with the sidewalls of said recess.

2. A mold for forming a rubber article and providing a marking thereon comprising a body having a molding surface engageable with the material to be molded, the said body having an open top recess entirely contained within said body and extending inwardly from the said surface with the sidewalls of said recess being undercut so that a transverse dimension of the recess inwardly from said surface is greater than the corresponding transverse dimension of said recess at the said surface, and a removable insert of resilient rubber composition disposed in said recess and having its outer surface provided with a configuration complementary to the marking to be formed on the molded article, the shape of said insert being substantially complementary to the shape of said recess and the dimensions of said insert being such that it is resiliently retained therein with the base of said insert engaging the base of said recess and the sidewalls of said insert resiliently engaged with the sidewalls of said recess thereby precluding the formation of a flash around said insert.

3. A mold for forming a rubber article and providing a marking thereon comprising a body having a molding surface engageable with the material to be molded, said body having an open top recess entirely contained within said body and extending inwardly from the said surface with the sidewalls of said recess being undercut so that a transverse dimension of the recess inwardly from said surface is greater than the corresponding transverse dimension of said recess at the said surface, and a removable insert of resilient butyl rubber composition disposed in said recess and having its outer surface provided with a configuration complementary to the marking to be formed on the molded article, the shape of said insert being substantially complementary to the shape of said recess and the dimensions of said insert being such that it is resiliently retained therein with the base of said insert engaging the base of said recess whereby the sidewalls of said insert are resiliently forced into sealing engagement with the sidewalls of said recess by the engagement of the outer surface of the insert with the article being formed in the mold.

4. A mold for forming a rubber article and providing a marking thereon comprising a body having a molding surface engageable with the material to be molded, said body having an open top recess entirely contained within said body and extending inwardly from the said surface with the sidewalls of said recess being undercut to provide a substantially dovetail cross-section, and a removable insert of resilient butyl rubber composition disposed in said recess and having its outer surface provided with a configuration complementary to the marking to be formed on the molded article, the shape of said insert being substantially complementary to the shape of said recess and the dimensions of said insert being such that it is resiliently retained therein with the base of said insert engaging the base of said recess whereby the sidewalls of said insert are resiliently forced into engagement with the sidewalls of said recess by the engagement of the outer surface of the insert with the article being formed in the mold.

References Cited in the file of this patent

UNITED STATES PATENTS

| Number | Name | Date |
|---|---|---|
| 601,825 | Conners | Apr. 5, 1898 |
| 1,371,501 | McLane | Mar. 15, 1921 |
| 1,567,402 | Venn | Dec. 29, 1925 |
| 2,014,010 | Wheatley | Sept. 10, 1935 |
| 2,087,355 | Oliver | July 20, 1937 |
| 2,296,016 | Bostwick | Sept. 15, 1942 |
| 2,305,412 | Frolich et al. | Dec. 15, 1942 |

FOREIGN PATENTS

| Number | Country | Date |
|---|---|---|
| 173,400 | Switzerland | Feb. 16, 1935 |